United States Patent [19]

Berstis

[11] 4,417,305
[45] Nov. 22, 1983

[54] METHOD FOR EVALUATING BOOLEAN EXPRESSIONS

[75] Inventor: Viktors Berstis, Rochester, Minn.

[73] Assignee: International Business Machines Corporation, Armonk, N.Y.

[21] Appl. No.: 300,133

[22] Filed: Sep. 8, 1981

[51] Int. Cl.³ .............................................. G06F 7/00
[52] U.S. Cl. .................................................. 364/300
[58] Field of Search ................ 364/200, 300, 716, 900

[56] References Cited

U.S. PATENT DOCUMENTS 4,001,789  1/1977  Sweet .................................. 364/200
4,120,043 10/1978  Su ....................................... 364/900
4,165,534  8/1979  Dummermuth et al. ........... 364/900

OTHER PUBLICATIONS

IBM Technical Disclosure Bulletin–Iterative Common Truth Set Detection Mechanism for Boolean Functin Satisfiability Recognition, Jun. 1974 vol. 17 No. 1 pp. 66-69.
IBM Technical Disclosure Bulletin–Matrix Method of Modifying Logical Expressions, May 1976, vol. 18 No. 12 pp. 3958-3963.
IBM Technical Disclosure Bulletin–Boolean Analysis Approach to Functional Macro Generation, Jun. 1977, vol. 20 No. 1 pp. 61-62.

Primary Examiner—Raulfe B. Zache
Attorney, Agent, or Firm—Donald F. Voss

[57] ABSTRACT

A method for evaluating boolean expressions includes steps of forming a first vector for selecting and conditioning the boolean variables prior to their evaluation and forming a second vector for specifying logical AND and OR operations in the normal form of the boolean expression. Evaluation of the boolean expression is then performed by translating the first vector using the boolean variables as a translate table. The result of the translation is logically combined with the second vector using an exclusive OR function. The result of the exclusive OR operation is translated with and upon itself and the state of the last position of the result of this translation is the result of the evaluation of the boolean expression.

6 Claims, 2 Drawing Figures

METHOD FOR EVALUATING BOOLEAN EXPRESSIONS

TECHNICAL FIELD

This invention relates to a method for evaluating boolean expressions in a computer system.

BACKGROUND ART

There have been special purpose Boolean processors as set forth in U.S. Pat. No. 4,001,789 and general purpose processors can be programmed using logical instructions to evaluate Boolean expressions. These prior art approaches have the drawback of being limited in the case of the special purpose Boolean processors and of being slow and storage inefficient in the case of the general purpose processors. The method of the present invention is performed using a general purpose computer system and is more flexible than prior methods because it enables evaluation of Boolean expressions formed at run time or previously formed Boolean expressions or Boolean expressions which have been modified during a process performed by the computer system. Also in those instances where the number of variables of the Boolean expression is three or greater, which is very common, the present invention is more storage efficient because only three instructions are used by the method to evaluate the Boolean expressions after having first formed and stored two processing control vectors.

DISCLOSURE OF THE INVENTION

For each boolean expression first and second vectors are formed from the boolean expression. The first vector selects the variables of the expression as it is translated during the evaluation steps with the variables in a string as the translate table. The result of the translation is set in a work area and is logically combined with the second vector which specifies the AND and OR logical operations, using an exclusive OR function. The result of this logical operation is then translated with and upon itself whereby the Boolean expression is evaluated and the state of the last position in the result of this translation is the value of the Boolean expression.

DESCRIPTION OF THE INVENTION

Figure 1:
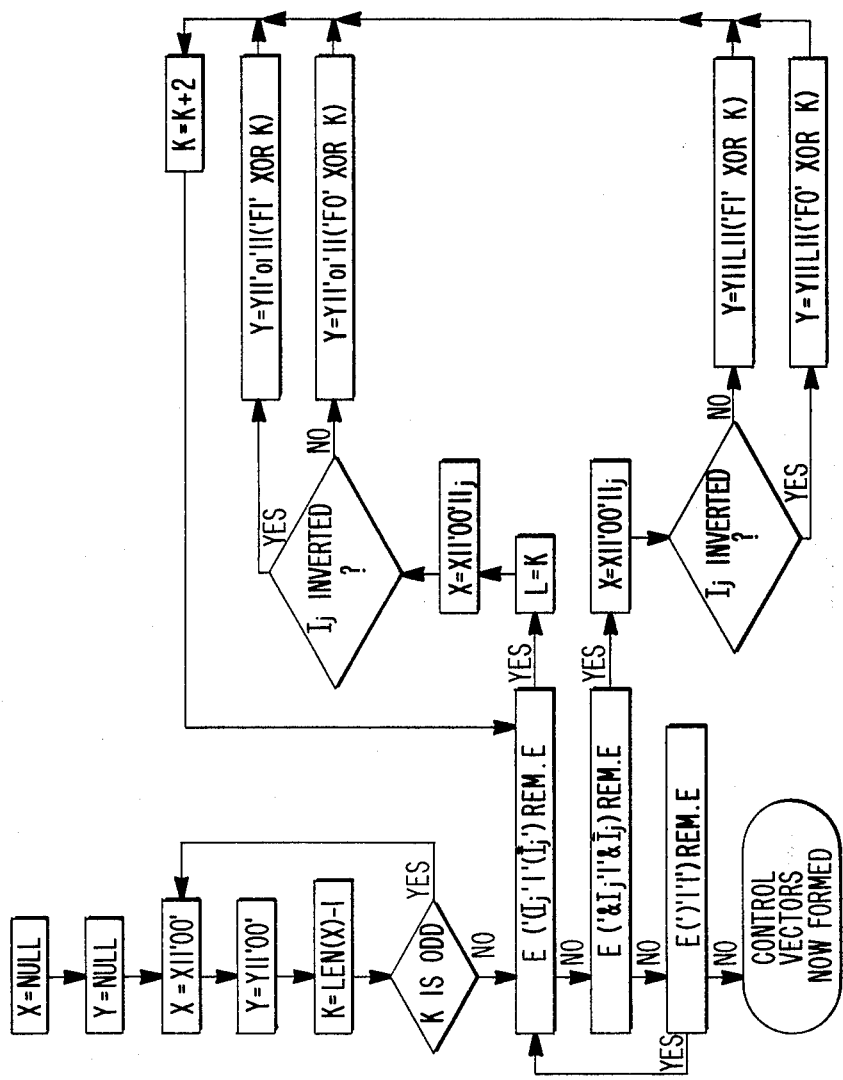
FIG. 1 is a flow diagram illustrating the steps for forming the control vectors
and
FIG. 2 is a flow diagram illustrating the steps of using these vectors in the evaluation of the Boolean expressions.

With reference to the drawing the invention is illustrated by way of example as a method implementable in any computer system having a translate instruction or capable of simulating or emulating such an instruction. The IBM computer system 360 which is shown and described in U.S. Pat. No. 3,400,371 issued Sept. 3, 1968 entitled "Data Processing System" can be used to implement the present invention for evaluating Boolean expressions.

Evaluation of Boolean expressions consists of performing the logical operations indicated by the expression using the values of the variables in the expression to derive a true or false result for the expression. The normal form of a Boolean expression is discussed in "Introduction to Switching Theory and Logical Design" by Frederick J. Hill and Gerald R. Peterson 1968 John Wiley and Sons particularly in Chapter 6. All Boolean expressions can be expressed in either normal form, sum of products or in the form of product of sums. The two forms are duals of each other. In the normal sum of products form, the word "sum" represents the logical OR (1) operation and "product" represents the AND (&) operation. The sum of products form of a Boolean expression can be the following expression E where E is represented as a sum of any number of product terms $P_i$:

$E = P1 | P2 | P3 - Pn$ and each term P is represented as the product of any number of literals $L_i$:

$P = L1 \& L2 \& L3 \&-\& Lm$. Each literal $L_i$ consists of either the Boolean variable $I_i$ or the inverse of the Boolean variable $I_i$.

The normal methods for evaluating Boolean expressions using a general purpose computer system include parsing and compiling the expression into instructions which are then executed or by parsing the Boolean expression and interpretively executing the parse tree. These methods are relatively slower than the present invention which, instead of parsing the expression and compiling instructions, forms two control vectors X and Y and then uses these vectors for evaluating the expression.

The first step in forming the control vectors X and Y, FIG. 1, is:

Step 0:
  (a) Set X=null string.
  (b) Set Y=null string.

Then for each Boolean expression the following steps are performed:

Step 1:
  (a) Set X=X || 00 ( || means concatenate)
  (b) Set Y=Y || 00
  (c) Set K=length of X minus 1
  (d) If K is odd repeat this entire step.

Step 2:
If the Boolean expression E starts with "(Ij" or "(Ij̄" then
  (a) delete this term as the leading term of E
  (b) Set L=K
  (c) Set X=X || 00 || j
  (d) If I is not inverted Set Y=Y || 01 || (F0 XOR K)
  (e) If I is inverted Set Y=Y || 01 || (F1 XOR K)
  (f) Set K=K+2
(F0 and F1 are hexidecimal notations for false and true respectively.)
(XOR is an exclusive OR logical function.)

Step 3:
If the Boolean expression E starts with "&Ij" or "&Ij̄" then
  (a) delete this term as the leading term of E
  (b) Set X=X || 00 || j
  (c) If I is not inverted Set Y=Y || L || (F1 XOR K)
  (d) If I is inverted Set Y=Y || L || (F0 XOR K)
  (e) Set K K+2

Step 4:
If the Boolean expression E starts with ")" or "|" then this term is deleted as the leading term of E.

Step 5:
Steps 2–4 are repeated until the entire expression E has been processed.

Step 6:

Save the value K which is used to point to a position in the result string during the evaluation steps to represent the value (01 true or 00 false) of the expression.
Note: 00, 01, F0, F1, j and k are one byte hexidecimal values.

Figure 2:
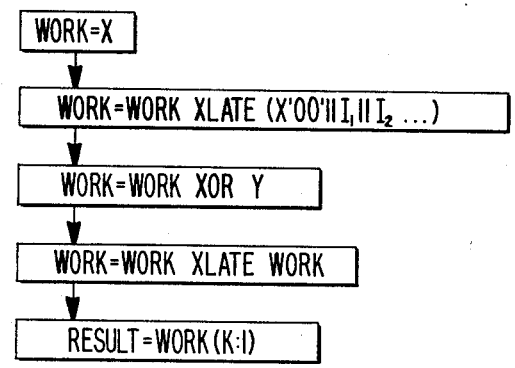

The evaluation of the Boolean expression, FIG. 2, is accomplished by translating the X vector using the Boolean variables I1, I2, etc., as the translate table. Translation in this instance is a process as described in the referenced U.S. Pat. No. 3,400,371. The Translate Instruction is described in this patent at Column 90, lines 25–52 using a format set forth on Column 88, lines 16–56 having a microcode logic embodied as in FIGS. 5NA1 to 5NA3. The Translate Instruction is also described in IBM 360 and 370 Principles of Operation manuals GA22-6821-8 and GA22-7000-4 respectively. The Translate Instruction used as a step to implement the present invention can best be understood by the following example.

EXAMPLE

Let E=(I1 & I3)|(I5 & $\overline{I2}$ & I6)|(I4) Then using the afore-described steps to generate X:

X=00 00 01 00 03 00 05 00 02 00 06 00 04

The translate table is:

00 || I1 || I2 || I3 || I4 || I5 || I6 || I7 etc.

and performing the translation X becomes:

X=00 00 I1 00 I3 00 I5 00 I2 00 I6 00 I 4

With the translation of vector X completed the next step of the evaluation process is to perform an exclusive OR (XOR) operation using the translated vector X and vector Y as operands. This step is illustrated by the following example using the expression of the previous example.

EXAMPLE

Using the afore-described steps to generate Y:

Y=00 01 F0 00 F3 01 F4 04 F6 04 F9 01 FA

Translated X=00 00 I1 00 I3 00 I5 00 I2 00 I6 00 I4

Translated X XOR Y=00 01 I1 00 I3 01 I5 04 I2 04 I6 01 I4

Prior to the exclusive OR operation each of the variables I in the Boolean expression had the value of F1 (true) or F0 (false). After the exclusive OR operation the variables I1, I2, I3, I4, I5 and I6 have the following values:

| | | | |
|---|---|---|---|
| I1 = | 00 false | ie F0 XOR F0 = 00 | |
| | 01 true | ie F1 XOR F0 = 01 | |
| I2 = | 06 false | ie F0 XOR F6 = 06 | |
| | 07 true | ie F1 XOR F6 = 07 | |
| I3 = | 03 false | ie F0 XOR F3 = 03 | |
| | 02 true | ie F1 XOR F3 = 02 | |
| I4 = | 0A false | ie F0 XOR FA = 0A | |
| | 0B true | ie F1 XOR FA = 0B | |
| I5 = | 04 false | ie F0 XOR F4 = 04 | |
| | 05 true | ie F1 XOR F4 = 05 | |
| I6 = | 09 false | ie F0 XOR F9 = 09 | |
| | 08 true | ie F1 XOR F9 = 08 | |

Hence the result of the exclusive OR operation can be represented as follows:

| Position | 00 | 01 | 02 | 03 | 04 | 05 | 06 | 07 | 08 | 09 | 0A | 0B | 0C |
|---|---|---|---|---|---|---|---|---|---|---|---|---|---|
| Translated X XOR Y = | 00 | 01 | I1 | 00 | I3 | 01 | I5 | 04 | I2 | 04 | I6 | 01 | I4 |
| False values | 00 | | | 03 | | 04 | | 06 | | 09 | | 0A | |
| True values | 01 | | 02 | | 05 | | 07 | | 08 | | 0B | | |

The next step in the evaluation process is to translate the result of the exclusive OR operation using the result itself as the translate table. The translation of each position in the result will be described to provide a clear understanding of the process.

The value 00 in position 00 translates to 00.

The value 01 in position 01 translates to 01.

The value I1 in position 02 translates to 00 if I1=00 i.e. the value 00 points to position 00 and the value in this position is 00 or to 01 if I1=01 i.e. the value 01 points to position 01 and the value in this position is 01.

The value 00 in position 03 translates to 00 because the value 00 points to position 00 and the value in this position is 00.

The value I3 in position 04 translates to 00 if I3=03 or to the value of I1 if I3=02. The value 03 points to position 03 which has a value of 00. The value 02 points to position 02 which has the value of I1. I1, as previously noted, can have the value of 00 or 01. Thus the value in position 04 will be 00 (false) if either I1 or I3 is 00 (false) or will be 01 (true) only if I1 and I3 are both 01 (true). It is seen that upon completing the translation of position 04, the logical operation of ANDing I1 with I3 has been performed. Position 04 contains the value of the sub-expression (I1 & I3).

The value 01 in position 05 points to position 01 which has a value of 01. The value I5 in position 06 translates to the value in position 04 if I5=04 or to the value 01 in position 05 if I5=05. Therefore position 06 will contain the value of the sub-expression (I1&I3)|I5.

The value 04 in position 07 points to position 04 which has the value of I3. Thus the value of the sub-expression at position 04 is copied into position 07. The value I2 in position 08 will be the value of I5 in position 06 if I2=06 or the value of I3 which had been copied into position 07 if I2=07. Postion 08 after translation has a value which represents the result of the logical operation of (I1&I3)|(I5&$\overline{I2}$).

The value 04 in position 09 copies the value of the sub-expression at position 04 into position 09. The value I6 in position 0A will be the value of the sub-expression copied into position 09 if I6=09 or the value of I2 in position 08 if I6=08. This has the effect of placing the value of the following sub-expression into position 0A:

(I1&I3)|(I5&I2&I6).

The value 01 in position 0B points to position 01 which has a value of 01. Hence this value in position 0B translates to itself.

The value I4 in position 0C will translate to the value in position 0A if I4=0A or to 01 if I4=0B. Position 0C has the value of the Boolean expression (I1&I3)|(I5&I2&I6)|I4 and thus has the value of E.

From the foregoing it is seen that the method of this invention simply uses a translate instruction, and an exclusive OR instruction followed by another translate instruction to evaluate the Boolean expression after forming the two control vectors X and Y from the Boolean expression The primitive logic functions performed in translating the result string of translated X XOR Y take the form:

| Position | N | N+1 | N+2 |
|----------|---|-----|-----|
| Value    | X | Y   | I   |

Where I is one of the exclusive-ored input variables. Where X and Y are either constant (00 or 01), the value of some exclusive-ored input variable I or the value of some previously computed sub-expression.

The true/false values of I correspond to the position numbers for values X and Y above. Thus if I results in a value of position N, then the value (X) in the Nth position is copied into position N+2. Otherwise, I must result in a value at position N+1, causing the value (Y) to be copied into position N+2. This can be expressed by the equation:

$$N+2 \text{ becomes } (\bar{I} \& X) | (I \& Y)$$

The meaning of I can be inverted either with the exclusive-or constant B or by interchanging X and Y.

The true/false value of I differs by only one bit (the units position). This means that N should always be even. The following table shows the various possible logic results at position N+2 by selecting appropriate values for X and Y. P and Q are results of another sub-expression earlier in the string, located at position P and Q, respectively.

| X at N | Y at N+1 | Result at N+2 |
|--------|----------|---------------|
| 0 | 0 | 0 |
| 0 | 1 | I |
| 0 | P | (I & P) |
| 1 | 0 | $\bar{I}$ |
| 1 | 1 | 1 |
| 1 | P | ($\bar{I}$ | P) |
| P | 0 | ($\bar{I}$ & P) |
| P | 1 | (I | P) |
| P | P | P |
| P | Q | ($\bar{I}$ & P) | (I & Q) |

With these functions, any boolean expression can be computed. Typically, equations would be written or converted to a "product of sums" or "sum of products" (as was the example), to simplify the construction of vector strings X and Y. The head of string should contain 00 01 so that these two values are not altered during the translate.

The method of this invention could evaluate more than one boolean expression at a time; by using multi-valued variables instead of binary valued variables; and optimizing the translate process to a minimum number of characters. For example, the first four characters of the example string need not be translated. If the boolean expressions are so complex that one 256 byte translate cannot accommodate them, then the result values of a previous translate can be input to a second translate which continues the evaluation of the expression(s). Thus the size of the boolean expression which can be evaluated is limited only by availability of computer storage space.

I claim:

1. Method for evaluating boolean expressions in a computer system comprising:

forming a first constant from the expression to specify rearrangement of the variables,
setting said first constant into a work area,
translating said first constant in said work area using the variables as a translate table,
forming a second constant from the expressions where the second constant functions to change the values of the variables to position numbers having values one less and two less than the position number of the variable and where the second constant changes the zeros between variables into position numbers which point to previous positions in the result string containing values of previously evaluated subexpressions,
logically combining said translated first constant with said second constant using an exclusive OR operation, and
translating the result of the exclusive OR operation using the result as the translate table as the result is changing during the translation, the result from last translation in the result being the value of the boolean expression being evaluated.

2. Method for evaluating boolean expressions in a computer system where the boolean expressions are represented by $E = P1 | P2 | P3 - Pn$ and each term P is represented as the product of any number of literals Li and each literal Li consists of either the boolean variable Ii or the inverse $\bar{I}i$ comprising the steps of:

forming first and second control vectors X and Y respectively by first:

Set X = null string
Set Y = null string second:

Set X = X||00
Set Y = Y||00

Form K by setting
K = length of X minus 1
Test K for condition of odd or even
Repeat second: if K is odd,
third: Test boolean expression for form of leading term where the form can be "(Ij" or "($\bar{I}$j" or "&Ij" or ")" or "|" and if leading term is:
"(Ij" or "(Ij" delete leading term from expression, form a constant L by setting L=K, set X=X || 00 || j, set Y=Y || 01 || (F0 XOR K) if I is not inverted, set Y=Y || 01 || (F1 XOR K) if I is inverted, set K=K+2, if leading term is "&Ij" or "&$\bar{I}$j" delete leading term from expression, set X=X || 00 || j, set Y=Y || L || (F1 XOR K) if I is not inverted, set Y Y || L || (F0XOR K) if I is inverted, set K=K+2, if leading term is ")" or "|" delete leading term from expression, repeat third: until all terms of expression are deleted,
translating first control vector X using the boolean variables Ii or $\bar{I}i$ as the translate table,
combining translated vector X with vector Y using an exclusive OR operation,
translating the result of the exclusive OR operation using the result as the translation table as the result is changing during the translation, the result from the last translation in the result being the value of the boolean expression evaluated.

3. Method for evaluating boolean expressions in a computer system comprising:

creating a first vector from the boolean expression being evaluated by loading a first register with variable pointers corresponding with boolean variables in the expression and with two zeros preceding the first variable pointer and a zero between said variable pointers, creating a second vector from the boolean expression by loading a second register with values created from the boolean expression by combining the value of the boolean variables with the position numbers less one using an exclusive OR operation and using the false value of the variable in place of the true value when the variable is preceded by a logical AND operator, the created values being loaded in the odd positions of said second register starting with the third position thereof, the first position thereof being loaded with a zero and the even positions thereof being loaded with a one when the corresponding position of the variable in the boolean expression is bracketed by a left parenthesis preceded by a logical OR operator, with the value of the corresponding position of the last variable in the preceding product term and with a zero when there is no preceding product term, translating the contents of said first register using the boolean variables as a translate table, combining the translated contents of said first register with the contents of said second register using an exclusive OR operation, and translating the result produced from combining the translated contents of said first register with the contents of said second register using an exclusive OR operation where the result is used as the translate table as the result is changing during the translation, the result from last translation in the result being the value of the boolean expression evaluated.

4. The method of claim 3 where the translated contents of said first register are returned to said first register.

5. The method of claim 3 where the result of combining the translated contents of said first register with the contents of said second register using an exclusive OR operation is entered into said first register to replace the previous contents thereof.

6. The method of claim 3 where the boolean variables used as a translate table in the translation of the contents of said first register are loaded into a third register in positions succeeding the first position thereof in order according to the index numbers of said boolean variables, said first position of said third register being loaded with a zero.

* * * * *

UNITED STATES PATENT AND TRADEMARK OFFICE
CERTIFICATE OF CORRECTION

PATENT NO. : 4,417,305
DATED : Nov. 22, 1983
INVENTOR(S) : Viktors Berstis

It is certified that error appears in the above-identified patent and that said Letters Patent are hereby corrected as shown below:

Column 2, line 17, change " $\acute{I}i$ " to -- $\overline{I}i$ --

Column 4, line 51, change " (I1&13)/(15&12&16) " to --(I1&13)/(15&$\overline{12}$&16) --

Column 4, line 57, change "OC" to -- OC --

Column 4, line 58, change "/(15&12-" to -- /15&$\overline{12}$- --

Column 5, line 18, change " ($\widetilde{I}$ & X) " to -- ($\overline{I}$ & X) --

Column 6, line 23, change second "Ii" to -- $\overline{I}i$ --

Column 6, line 42, change " "(Ij" " to -- "$\overline{I}j$" --

Column 6, line 44, change second " "Ij" " to -- "$\overline{I}j$" --

Signed and Sealed this

Nineteenth Day of June 1984

[SEAL]

Attest:

GERALD J. MOSSINGHOFF

Attesting Officer

Commissioner of Patents and Trademarks